(12) United States Patent
Barrows et al.

(10) Patent No.: US 10,016,092 B2
(45) Date of Patent: Jul. 10, 2018

(54) COUNTERTOP APPLIANCE HAVING DETACHABLE BASE

(71) Applicant: National Presto Industries, Inc., Eau Claire, WI (US)

(72) Inventors: Ryan H. Barrows, Eau Claire, WI (US); James A. Hedrington, Chippewa Falls, WI (US); Jeffery A. Morgan, Chippewa Falls, WI (US); Bradley D. Sie, Mondovi, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 17 days.

(21) Appl. No.: 14/712,538

(22) Filed: May 14, 2015

(65) Prior Publication Data
US 2015/0245742 A1    Sep. 3, 2015

Related U.S. Application Data

(62) Division of application No. 13/328,850, filed on Dec. 16, 2011, now Pat. No. 9,060,640.

(51) Int. Cl.
*A47J 37/06* (2006.01)
*A47J 37/10* (2006.01)

(52) U.S. Cl.
CPC ......... *A47J 37/105* (2013.01); *A47J 37/0629* (2013.01); *A47J 37/108* (2013.01); *Y10T 29/49815* (2015.01); *Y10T 29/49826* (2015.01); *Y10T 29/49829* (2015.01)

(58) Field of Classification Search
None
See application file for complete search history.

(56) References Cited

U.S. PATENT DOCUMENTS

| 1,263,863 | A | * | 4/1918 | Crosby | A47J 37/0763 |
| | | | | | 126/339 |
| 2,156,214 | A | | 4/1939 | Woodman | |
| 2,297,332 | A | * | 9/1942 | Stewart | A47J 37/0694 |
| | | | | | 294/152 |
| 2,940,381 | A | | 6/1960 | Cottongim et al. | |
| 3,075,798 | A | * | 1/1963 | Smith | A47J 43/18 |
| | | | | | 294/15 |
| 3,194,460 | A | * | 7/1965 | Tupper | A45F 5/10 |
| | | | | | 220/318 |

(Continued)

OTHER PUBLICATIONS

Application and File history for U.S. Appl. No. 13/328,850, filed Dec. 16, 2011. Inventors: Barrows et al.

*Primary Examiner* — David Angwin
*Assistant Examiner* — John J Norton
(74) *Attorney, Agent, or Firm* — Patterson Thuente Pedersen, P.A.

(57) ABSTRACT

A countertop appliance having a detachable base with rotatable handles for selectively engaging a pan or cooking surface of the appliance. The rotatable handles of the detachable base are rotatable between a locked position in which the pan is secured to the base preventing separation of the pan from the base and a disengaged position where the pan can be lifted off the base. The rotatable handles can also be rotated into a stored position in which the handles are positioned within the detachable base, whereby the detachable base can be placed within the pan to facilitate storage and reduce overall shipping volume.

7 Claims, 16 Drawing Sheets

(56) References Cited

U.S. PATENT DOCUMENTS

| | | | |
|---|---|---|---|
| 3,306,329 A | 2/1967 | Reinhold | |
| 3,395,266 A | 7/1968 | Price | |
| 3,831,002 A | 8/1974 | Mysicka et al. | |
| 3,920,147 A | 11/1975 | Hiatt | |
| 3,947,657 A * | 3/1976 | Ershler | F24C 7/10 126/9 R |
| 3,967,803 A * | 7/1976 | Kienlen | A47J 36/34 248/150 |
| 4,200,040 A * | 4/1980 | MacRae | A47J 43/18 211/181.1 |
| 4,725,028 A * | 2/1988 | Conradt | A47J 36/34 248/150 |
| D341,523 S * | 11/1993 | Tiemann | D7/409 |
| D341,993 S * | 12/1993 | Kadlick, Sr. | D7/409 |
| 5,656,188 A | 8/1997 | Janowiak et al. | |
| 6,064,042 A | 5/2000 | Glucksman et al. | |
| 6,173,860 B1 * | 1/2001 | Lamers | A47J 45/061 220/573.1 |
| 6,220,477 B1 * | 4/2001 | Schneider | A47J 45/061 220/757 |
| 6,443,052 B1 | 9/2002 | Garber et al. | |
| 6,472,644 B1 | 10/2002 | Wu | |
| 6,595,120 B1 * | 7/2003 | Tiemann | A47J 37/0694 211/181.1 |
| 6,603,099 B2 * | 8/2003 | Gouthiere | A47J 27/04 219/401 |
| 7,090,094 B2 | 8/2006 | Wade et al. | |
| 7,228,792 B2 | 6/2007 | Crawford et al. | |
| D614,908 S | 5/2010 | Berge | |
| D642,423 S | 8/2011 | Seymour | |
| D643,675 S | 8/2011 | Seymour | |
| D658,428 S | 5/2012 | Seymour | |
| 8,322,564 B2 | 12/2012 | Magnouloux | |
| 2004/0200851 A1 | 10/2004 | Wooderson | |
| 2005/0127063 A1 | 6/2005 | Garziera | |
| 2007/0137499 A1 | 6/2007 | Leon et al. | |
| 2009/0025567 A1 | 1/2009 | Greenberg et al. | |
| 2009/0218355 A1 * | 9/2009 | Chameroy | A47J 45/062 220/573.1 |
| 2009/0236352 A1 | 9/2009 | Xie et al. | |
| 2010/0288775 A1 | 11/2010 | Wu et al. | |
| 2011/0005404 A1 | 1/2011 | Pan | |
| 2013/0153581 A1 | 6/2013 | Barrows et al. | |

\* cited by examiner

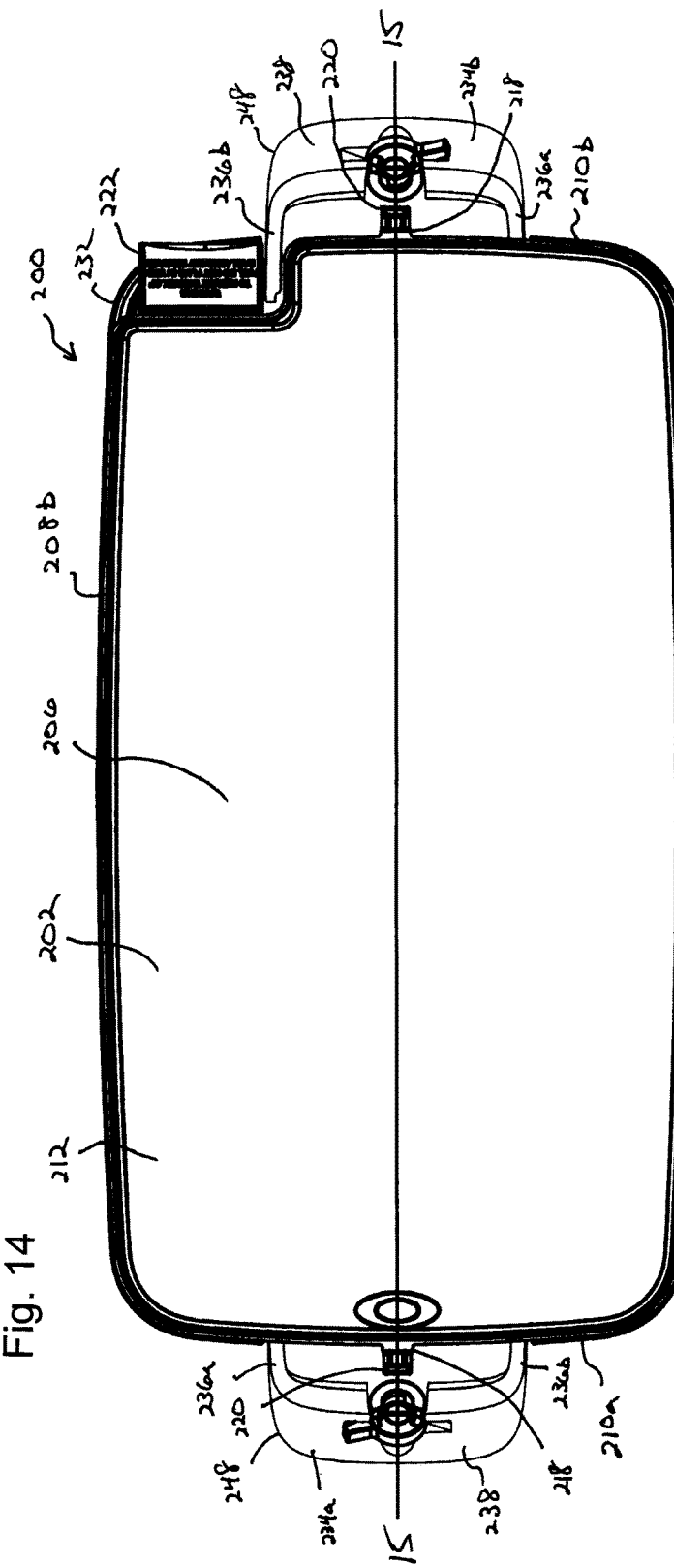
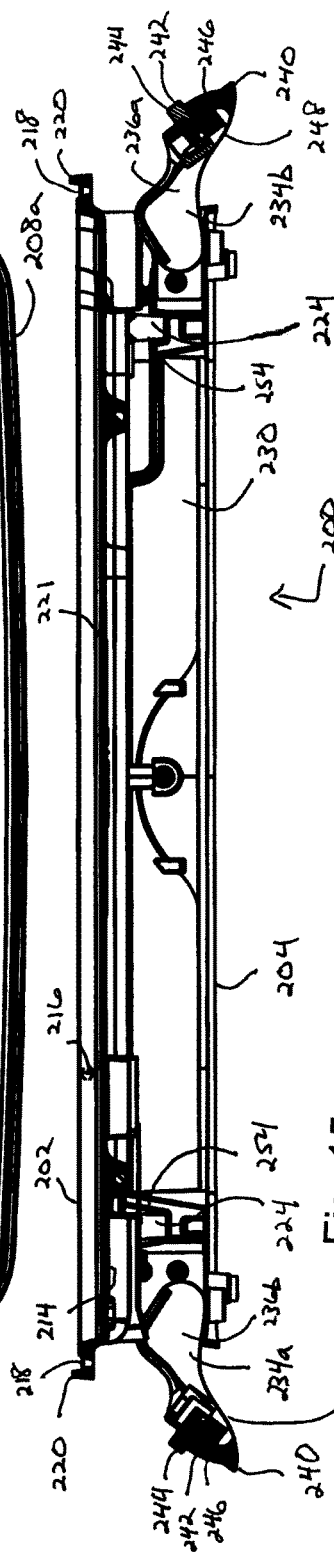
Fig. 14
Fig. 15

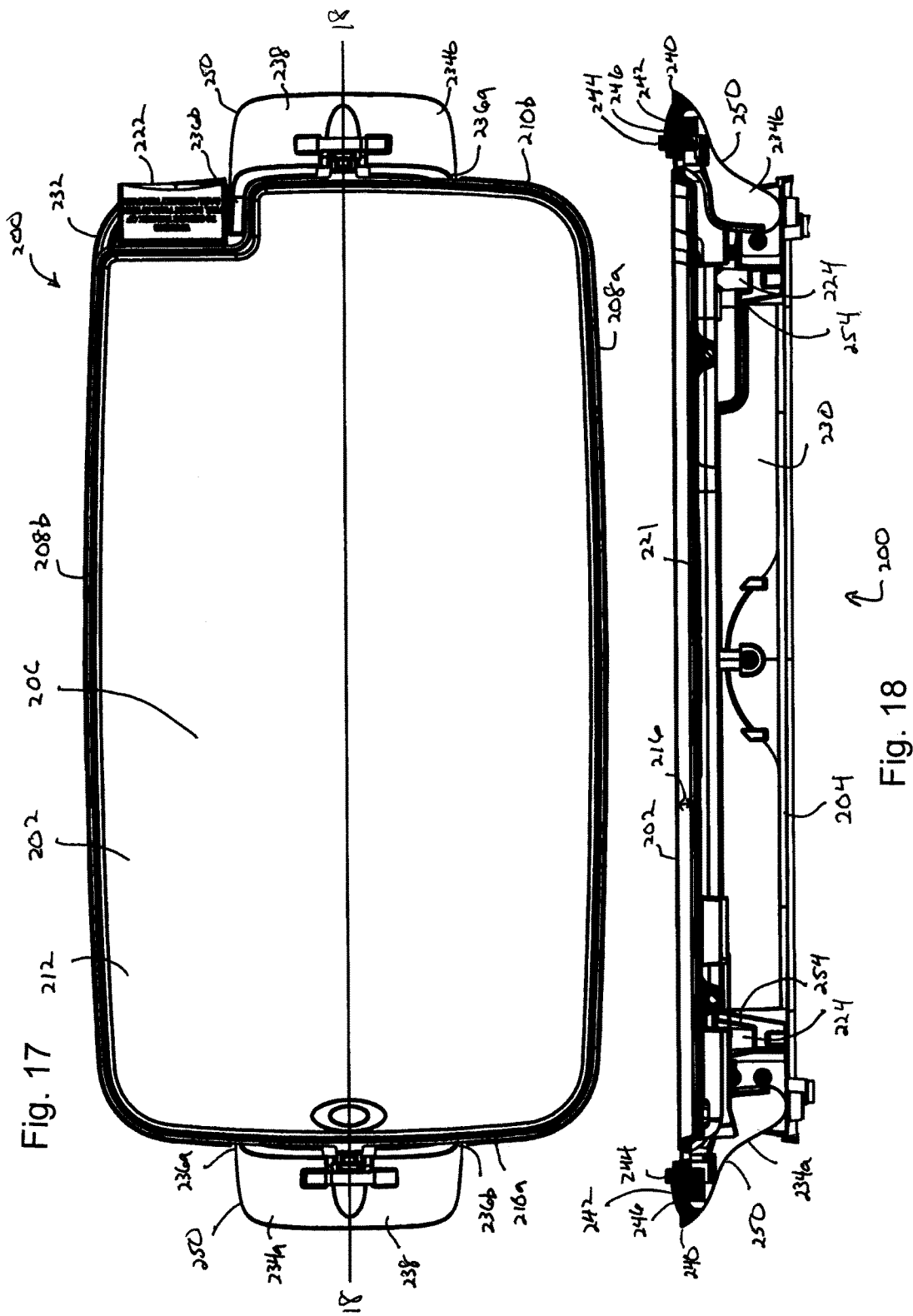

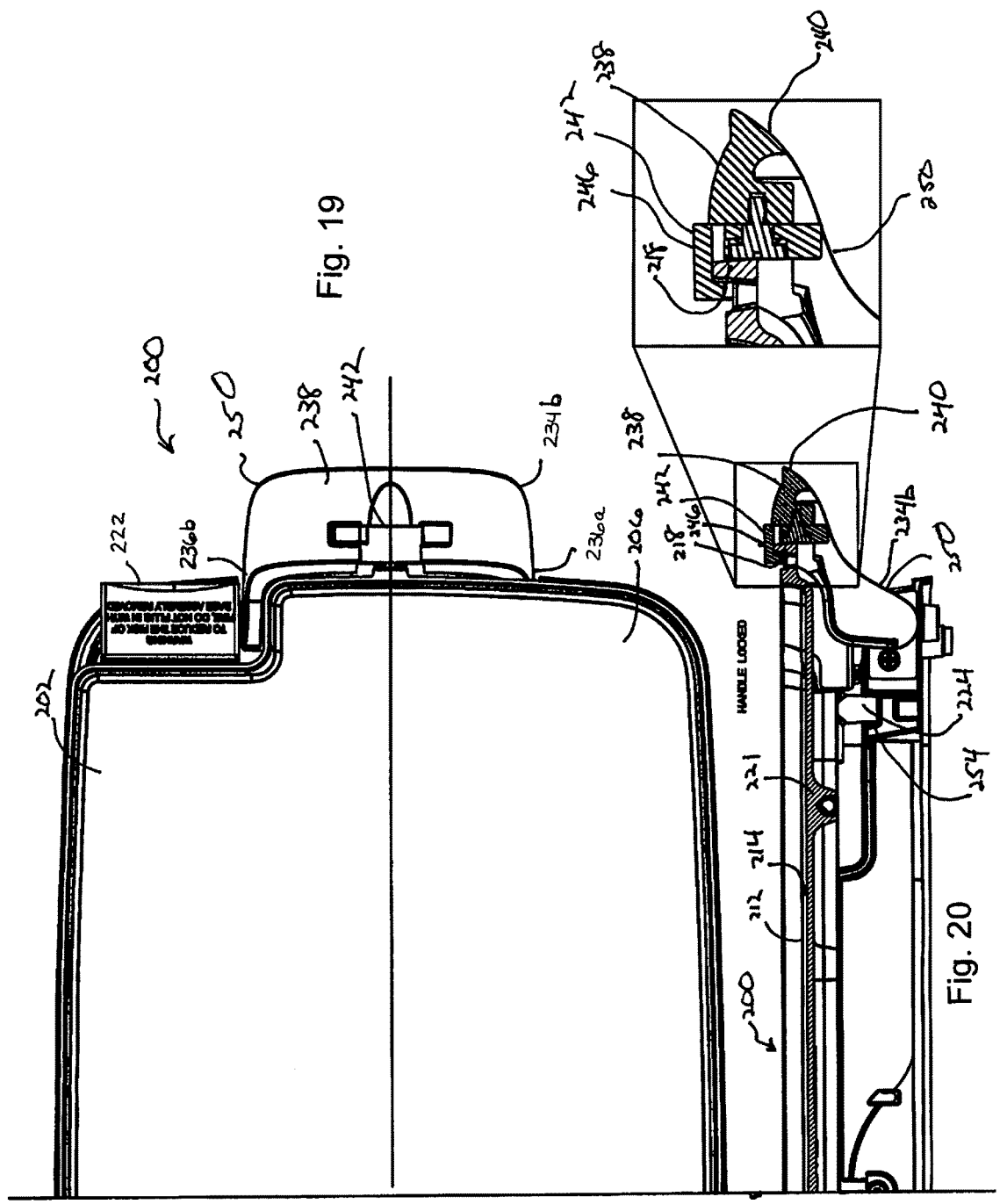

COUNTERTOP APPLIANCE HAVING DETACHABLE BASE

RELATED APPLICATION

This application is a division of application Ser. No. 13/328,850 filed Dec. 16, 2011, and entitled "COUNTERTOP APPLIANCE HAVING DETACHABLE BASE", which is hereby fully incorporated herein by reference.

FIELD OF THE DISCLOSURE

The present invention is generally directed to a countertop appliance. More specifically, the present invention is directed to a countertop cooking or serving appliance utilizing locking handles for releasably securing an appliance base to a cooking or serving surface so as to prevent unintentional release of the cooking surface.

BACKGROUND OF THE DISCLOSURE

Electric skillets and griddles are commonly used countertop cooking appliances that typically utilize a pan heated by an electric heating element for cooking or warming food items. The heating elements for these countertop appliances typically comprise a resistive heating element that becomes very hot when an electric current is passed through the heating element. The heating element is generally placed proximate to or against the bottom of the pan to heat the pan and correspondingly the contents of the pan. A base or a plurality of legs are often affixed to or placed beneath the pan so as to elevate the pan to avoid damaging a surface beneath the heating element. Because of the significant amount of heat generated by the heating element, the base used to elevate the pan is often several inches in height to insure the necessary amount of heat dissipates before reaching the underlying surface. While the height of the base is necessary to avoid damaging the underlying surface, the bulk created by the base can interfere with efficient cleaning, storing and shipment of the electric skillet.

Cleaning these types of appliances is often difficult and cumbersome due to the large and bulky assembly. This can make it difficult if not impossible to place the appliance within a dishwasher. Furthermore, it may be desirable to totally avoid placing the appliance within a dishwasher so as to avoid exposing a heat element and associated electrical receptacle to cleaning liquids. In addition to difficulties associated with cleaning, protruding handles from a base assembly can make storage difficult by increasing the bulk and length of the assembled appliance. Consequently, there is significant room for improvement of existing electric skillets, griddles and serving devices.

SUMMARY OF THE DISCLOSURE

The present invention is generally directed to countertop appliances including electric skillets, griddles and serving device that include a pan or cooking surface heated by an electric heating element and a selectively detachable base. The detachable base can further comprise at least one rotatable handle movable between a locked position in which the handle can be selectively arranged in an engaged position securing the base to the pan and a disengaged position in which the base can be separated from the pan. In the locked position, the handle can define a finger grip allowing users to grip and lift the combined base and pan assembly. When in the locked position, a latch assembly can prevent unintentional release of the pan from the detachable base. When in the disengaged position, the handle can be rotated into a storage position in which the handle is rotated inwardly of a perimeter defined by the detachable base. In some embodiments, the detachable base can be symmetrical thereby eliminating the need for the pan to have a specific engagement orientation with the pan and making it virtually impossible to incorrectly attach the pan to the detachable base. In the case of a skillet, the detachable base can be sized so as to fit within the pan when the handle is rotated into the storage position, thereby minimizing storage and shipping size. With the detachable bases as described, the various embodiments of countertop appliances can be quickly assembled (engaged position) and disassembled (disengaged position) by hand and without the use of tools or additional fasteners.

In one aspect of the present invention, a countertop appliance including skillets and griddles can comprise a base assembly and a detachable cooking pan. Alternatively, the countertop appliance can include a serving device including a base assembly and detachable serving pan. The base assembly generally comprises a pair of opposed handles that are rotatably attached to the base assembly. Each opposed handle can include a locking assembly that positively engages the detachable cooking pan when the handle is rotated into proximity with the detachable cooking pan. Generally, the locking assembly can comprise a positive latching member that physically engages a portion of the detachable cooking pan. In some embodiments, the positive latching member can comprise a spring member or a rotatable latch including a locking detent that prevents unintentional disengagement of the latch member from the detachable cooking pan. The locking assembly can further comprise an actuation member allowing a user to intentionally disengage the latch member such that that detachable cooking pan and base assembly can be separated for cleaning and storage. In the case of a skillet, the pair of opposed handles can be inwardly rotated so as to reside within a perimeter of the base assembly such that the entire base assembly can be positioned within the detachable cooking pan for storage so as reduce a packaging size as well as the amount of space necessary for storage. In some embodiments, the base assembly can be symmetrical such that the detachable cooking pan can be attached to the base assembly without the necessity of a unique arrangement of the detachable cooking pan to the base assembly.

In another aspect of the present invention, a method for reducing packaging size and storage volume for a countertop appliance can comprise providing a base assembly and a detachable cooking pan. The method can further comprise rotating a pair of opposed handles on the base assembly inwardly so as to reside within a footprint defined by the base assembly. In the case of a skillet, the method can further comprise placing the base assembly within the detachable cooking pan such that an overall volume necessary for packaging and storage of the electric skillet is defined solely by the detachable cooking pan.

In another aspect of the present invention, a method of assembling a countertop appliance can comprise providing a base assembly and a detachable pan. The detachable pan can be positioned to be set upon the base assembly. In some embodiments, the base assembly can by symmetrical such that the detachable pan properly interfaces with the base assembly in more than one unique orientation. Opposed handles on the base assembly can be rotated into position to latch into and lock the detachable pan relative to the base assembly. To disassemble the appliance, a user can manipulate an actuation member to release the latch such that the opposed handles can be rotated away from the detachable pan allowing the pan to be removed from on top of the base assembly. In the case of a skillet, the opposed handles can be rotated inwardly so as to reside within an exterior perimeter of the base assembly such that the entire base assembly can be placed within the detachable pan for packaging and storage.

In yet another aspect of the present invention, a rotatable handle locking system allows for safe transport of an assembled countertop appliance. In a locked position, a pan and base assembly are locked together such that a user can lift the pan and base together as a single, integral assembly allowing efficient transport. In the locked position, the base assembly is incapable of being separated from the pan without being intentionally released by a user. Furthermore, in the event that the rotatable handle locking system is not fully engaged, the pan is still capable of being lifted safely as the base assembly cradles the pan. In this manner, the potential for separation of the pan and base assembly while being carried by a user is significantly reduced.

In another aspect of the present invention, a rotatable handle locking system provides for simple and quick assembly and disassembly of an electric countertop appliance without the use of tools or additional fasteners. A pan can be engaged to a base assembly by placing the pan on the base assembly and rotating a handle into a locked position in which the handle positively engages the pan. In some embodiments, the base assembly can be symmetrical such that the pan is capable of being engaged in the locked position with the base assembly in more than one unique arrangement. Similarly, the pan can be disengaged from the base by rotating the handle into the disengaged position and lifting the pan off the base. According to an embodiment of the present invention, the base can comprise two opposing handles engaging opposite sides of the pan to insure that the pan is adequately secured to the detachable base. In some embodiments, the two rotatable handles can define surfaces conforming to the pan such that the only portion of the detachable base that physically engages the pan are the handles themselves.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be completely understood in consideration of the following detailed description of various embodiments of the invention in connection with the accompanying drawings, in which:

FIG. 14 is a plan view of a griddle having a detachable base arranged in an open position according to an embodiment of the present invention.

FIG. 15 is a front section view of the griddle of FIG. 14 taken at line 15-15 of FIG. 14.

FIG. 17 is a plan view of the griddle of FIG. 14 with the detachable based arranged in a closed position according to an embodiment of the present invention.

FIG. 18 is a front section view of the griddle of FIG. 17 taken at line 18-18 of FIG. 17.

FIG. 19 is a partial plan view of the griddle of FIG. 17.

FIG. 20 is a side, partial section view of the griddle of FIG. 17 including an enlarged view of a latch assembly according to an embodiment of the present invention.

Figure 1:
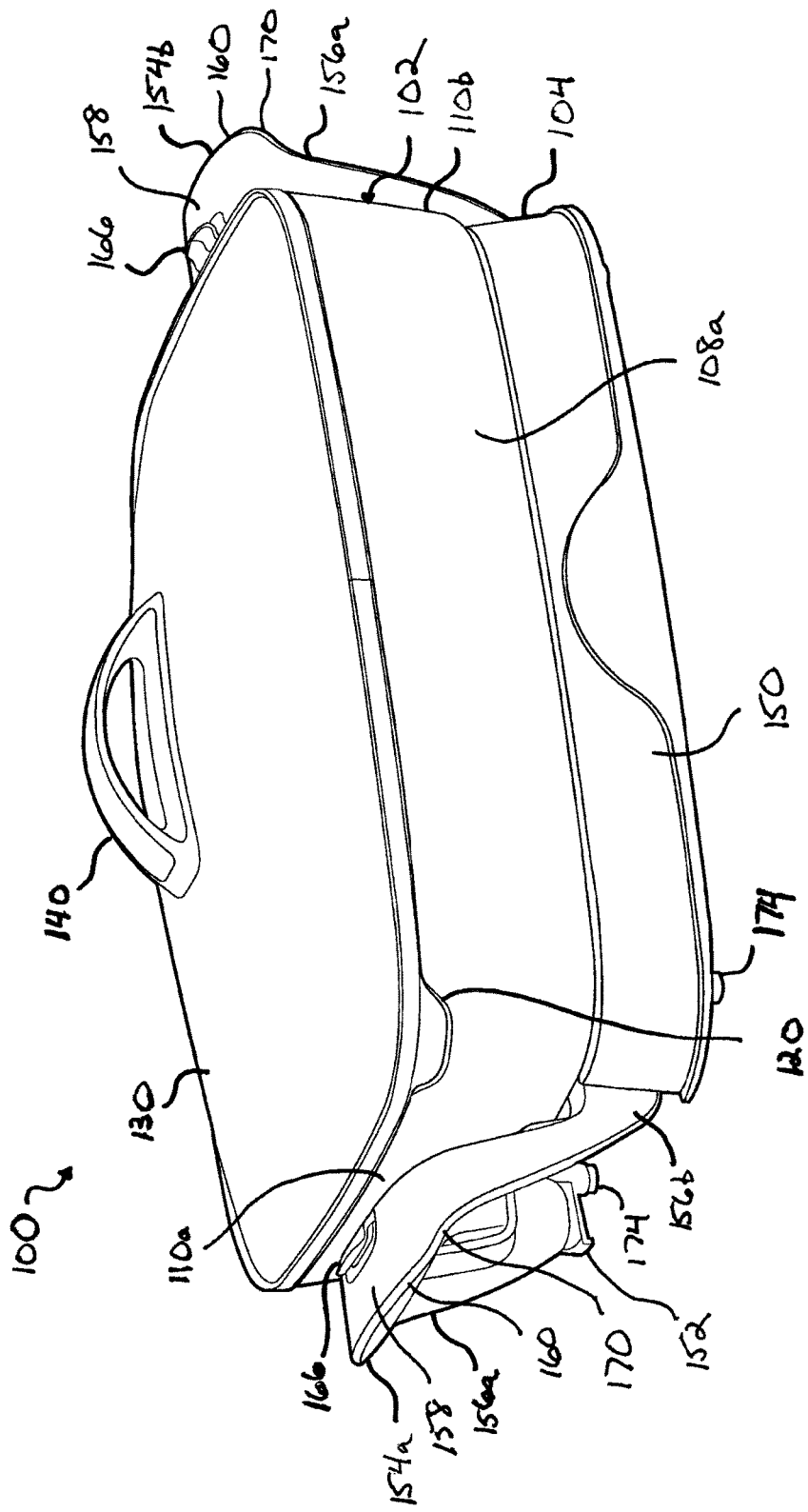
FIG. 1 is a perspective view of a countertop appliance having a detachable base according to an embodiment of the present invention.
Figure 2:
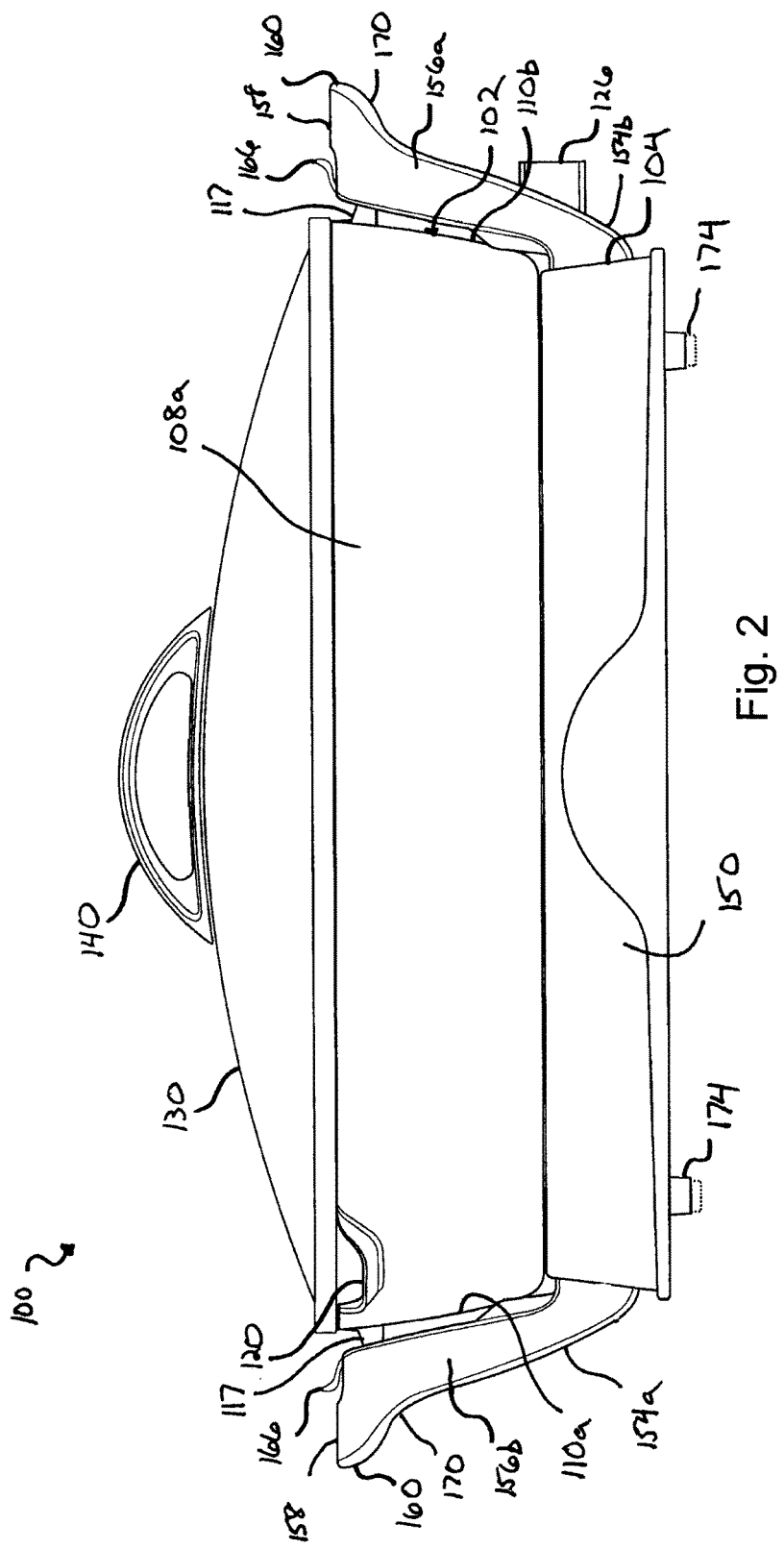
FIG. 2 is a front view of the countertop appliance depicted in FIG. 1.
Figure 3:
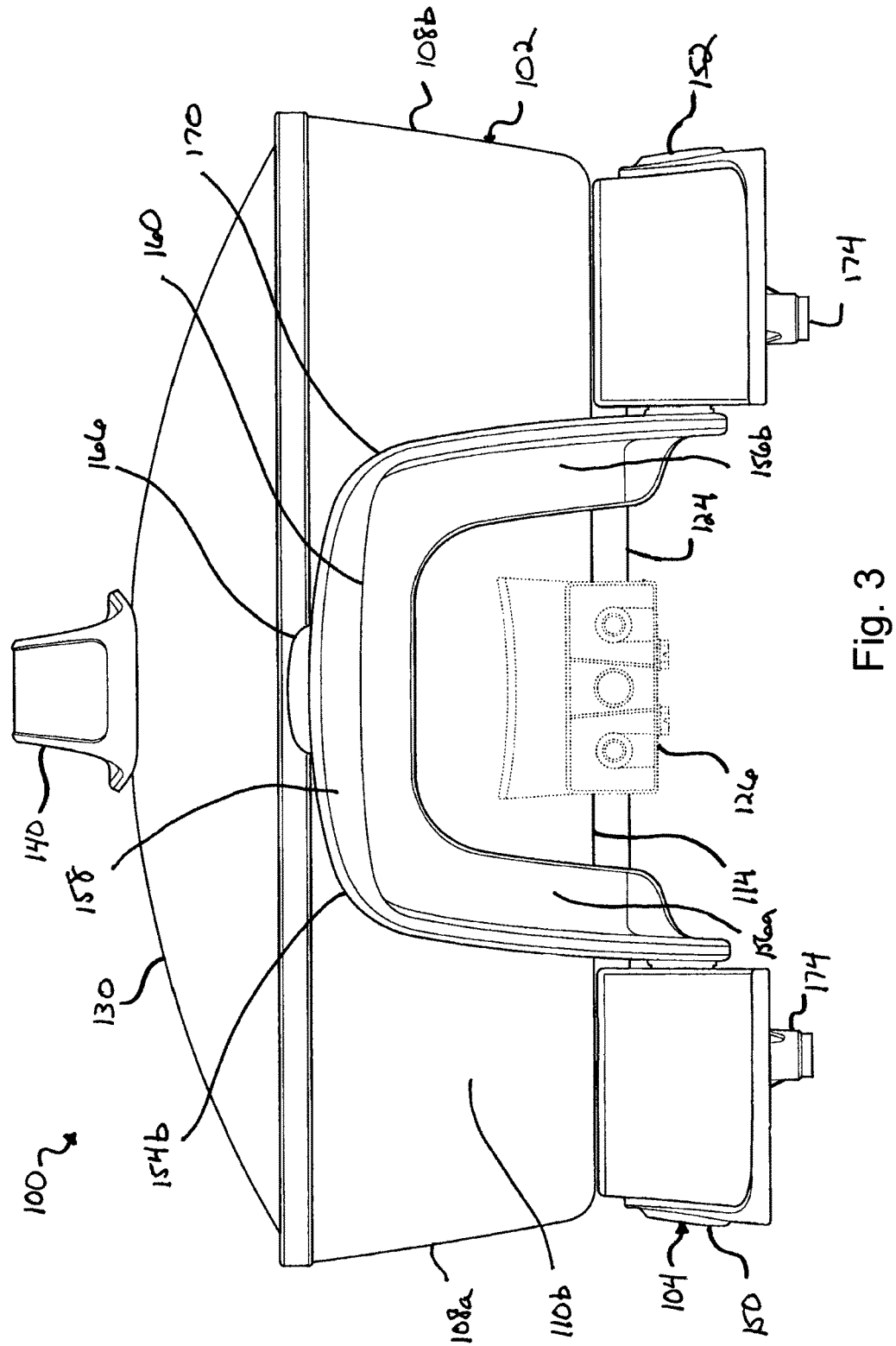
FIG. 3 is a first side view of the countertop appliance depicted in FIG. 1.
Figure 4:
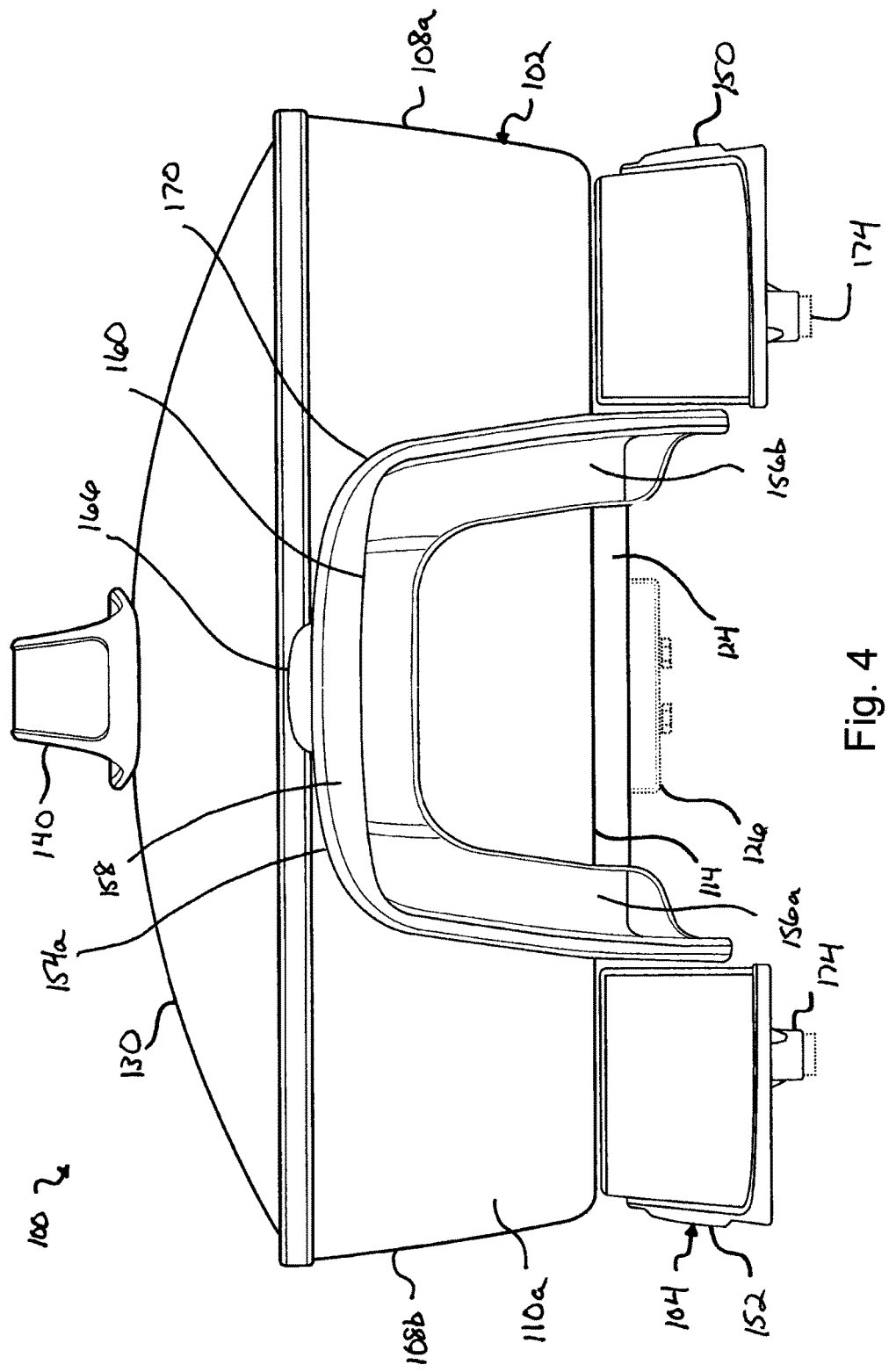
FIG. 4 is a second side view of the countertop appliance depicted in FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

As illustrated in FIGS. 1-13, a representative embodiment of a countertop appliance 100 of the present invention can comprise a detachable pan 102 and a base assembly 104. Countertop appliance 100 can be fabricated of conventional materials suitable for and associated with cooking food. For example, detachable pan 102 can comprise suitable metallic, plastic and/or ceramic materials and can comprise suitable coating such as, for example, nonstick coatings. Base assembly 104 can be formed to suitable metallic and polymeric materials. The materials associated with countertop appliance 100 should be compatible with conventional washing detergents. Countertop appliance 100 can be configured as a skillet including a heat source or alternative, a serving pan that does include a heat source.

Referring to FIGS. 1-7, 9 and 11-13, detachable pan 102 is generally defined by a pan floor 106, front and rear walls 108a, 108b and side walls 110a, 110b. Pan floor 106 includes an upper cooking surface 112 and a bottom heating surface 114. Each of the front and rear walls 108a, 108b and side walls 110a, 110b share a common wall height 116 so as to define an internal pan volume 118. Each side wall 110a, 110b includes a projecting member 117 including a latching detent 119. Detachable pan 102 can include one or more notches 120 along an upper pan surface 122. Notches 120 can function as a pouring spout or alternatively, as a resting area for a utensil, such as, for example, a serving spoon. A resistive heating element 124 can be mounted in direct contact with or in close proximity to the bottom heating surface 114. Resistive heating element 124 can be operably connected to a receptacle 126 allowing an electrical supply to be connected to the countertop appliance 100. Alternative, detachable pan 102 can be absent the resistive heating element 124 so as to provide a serving pan for use as a serving device on a countertop, table or similar flat surface. A plurality of guide posts 128 can be operably connected to the bottom heating surface 114. In some embodiments, a lid 130 can be included to set upon the upper pan surface 122. Lid 130 can include a handle 140 as well as a perimeter flange 142 that allows the lid 130 to be placed on top of detachable pan 102 such that it is retained within the upper pan surface 122. Lid 130 can be fabricated of a transparent or opaque material. As illustrated in FIGS. 1-13, detachable pan 102 can comprise a skillet pan. Alternatively, detachable pan 102 can comprise a serving pan in which a prepared food item, either hot or cold, can be retained and presented for consumption.

Figure 5:
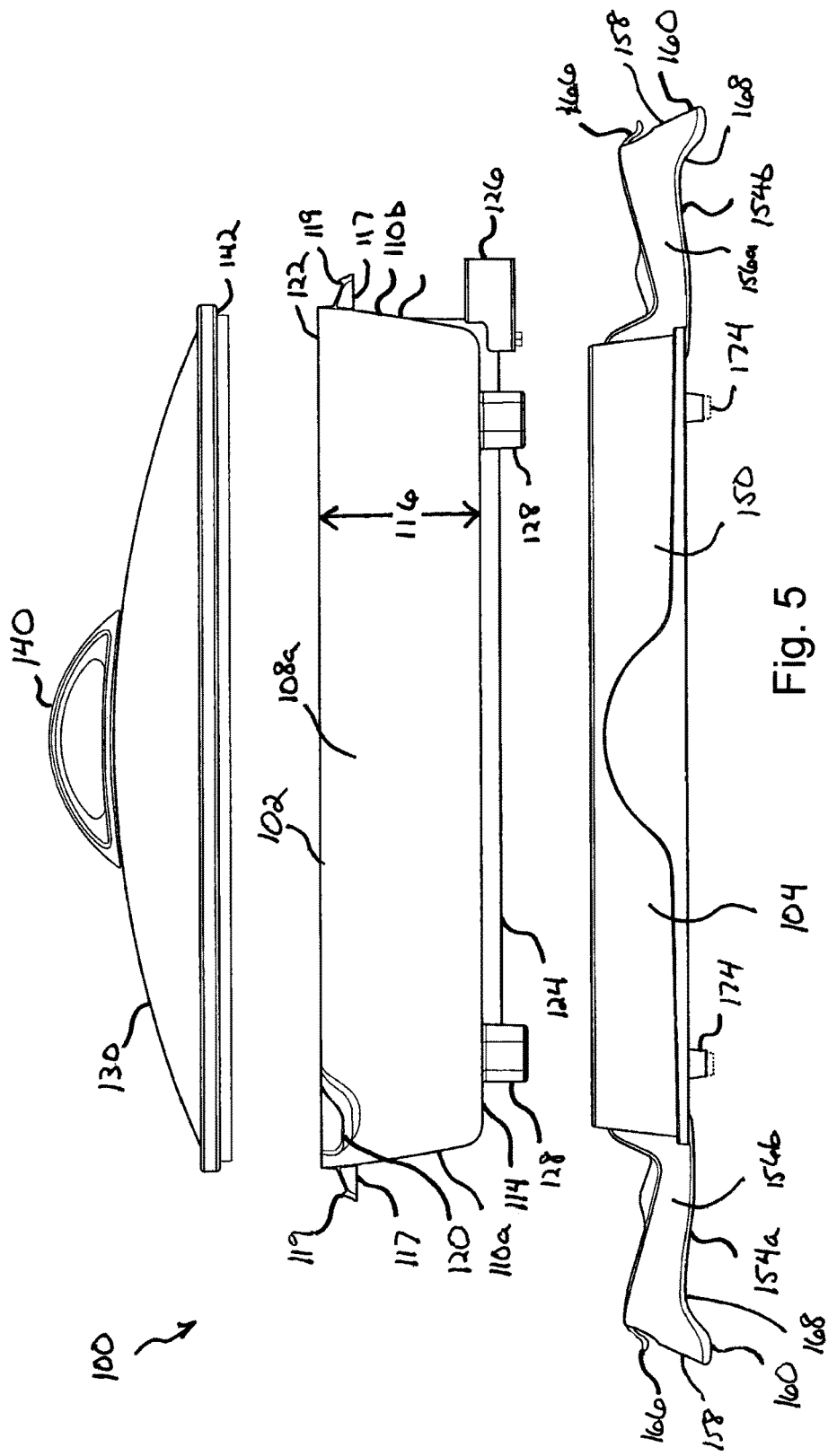
FIG. 5 is an exploded front view of the countertop appliance depicted in FIG. 1.
Figure 6:
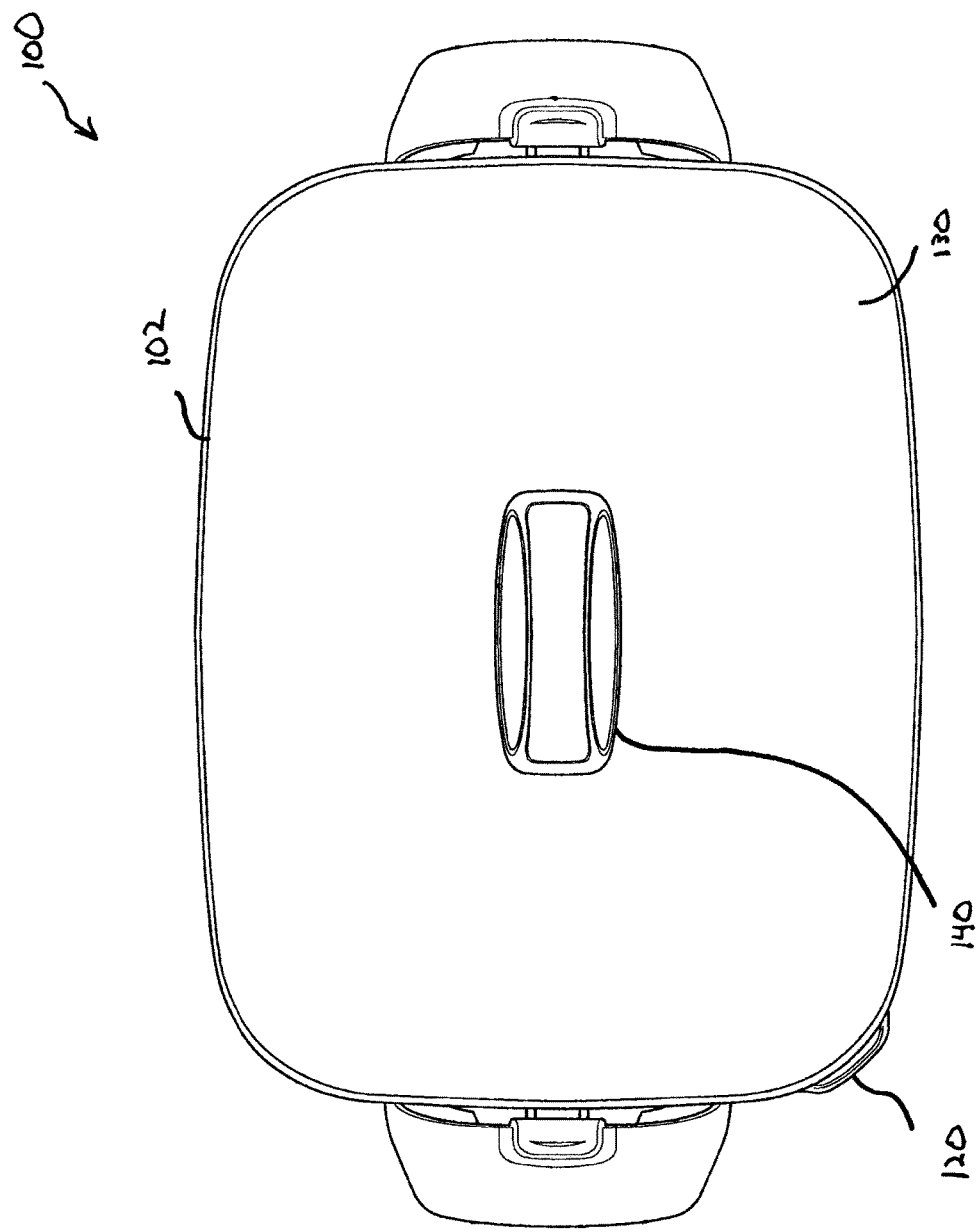
FIG. 6 is a top view of the countertop appliance depicted in FIG. 1.
Figure 7:
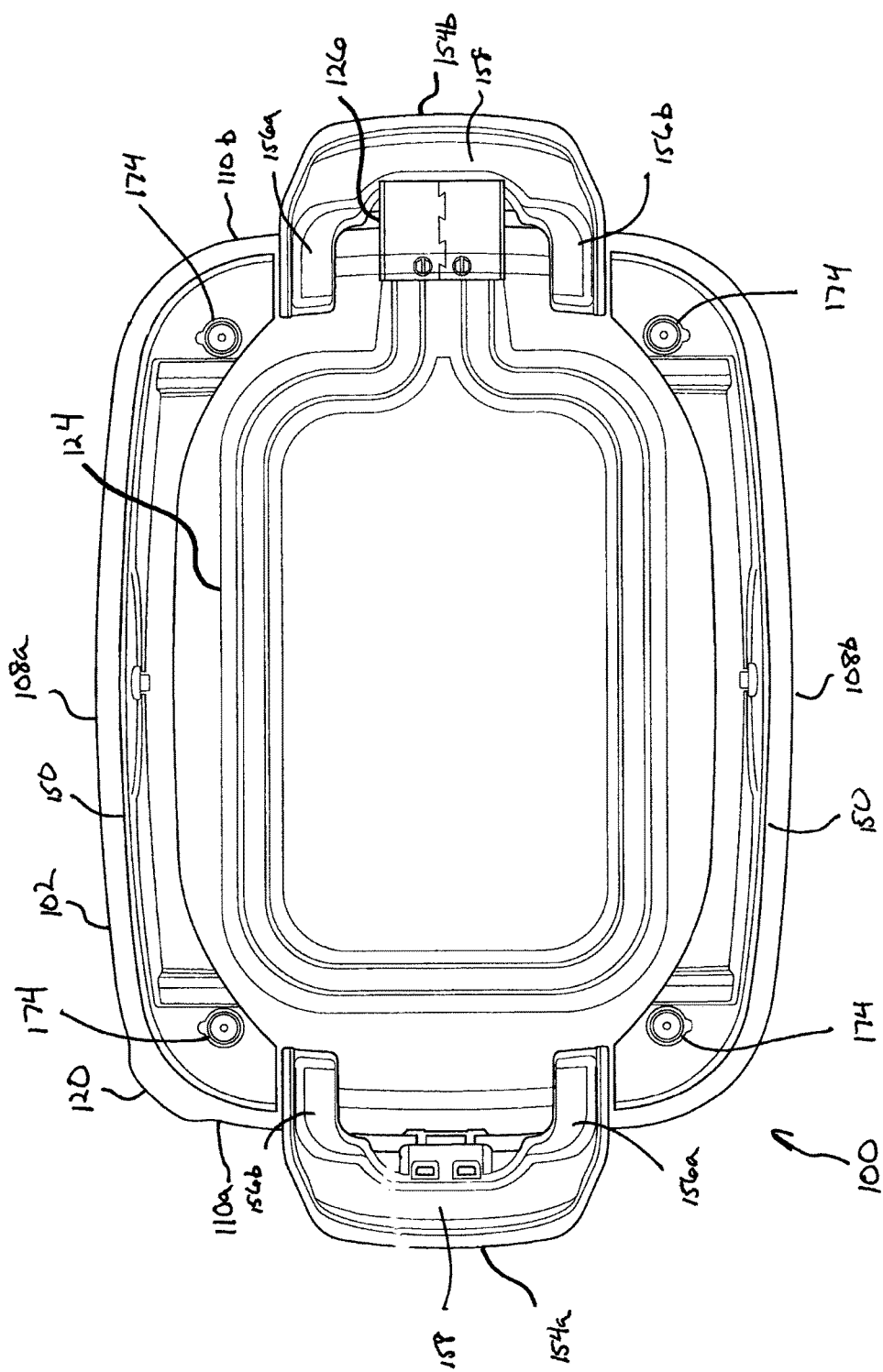
FIG. 7 is a bottom view of the countertop appliance depicted in FIG. 1.
Figure 8:
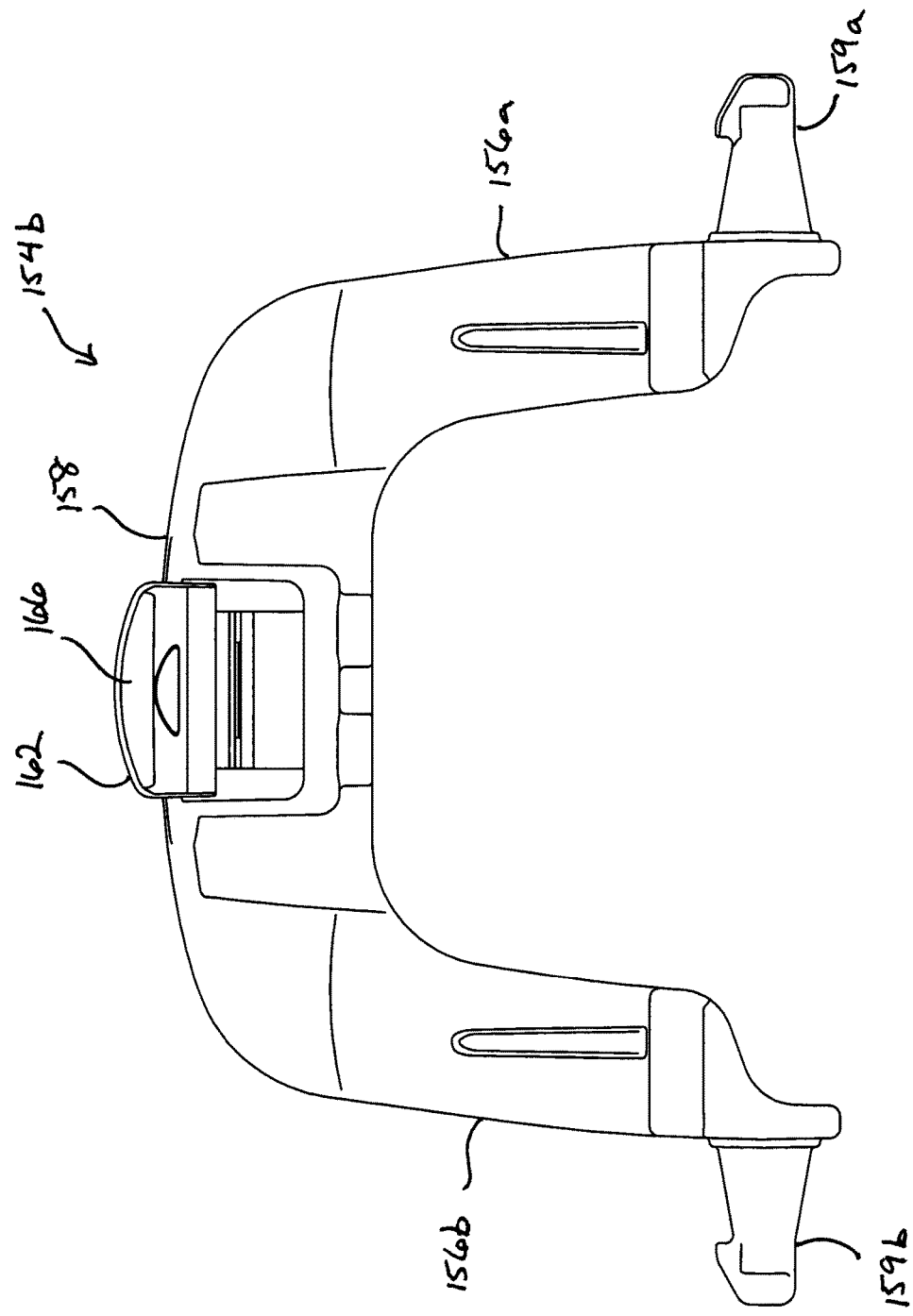
FIG. 8 is a top view of a rotating handle for use with the countertop appliance of FIG. 1 according to an embodiment of the present invention.
Figure 9:
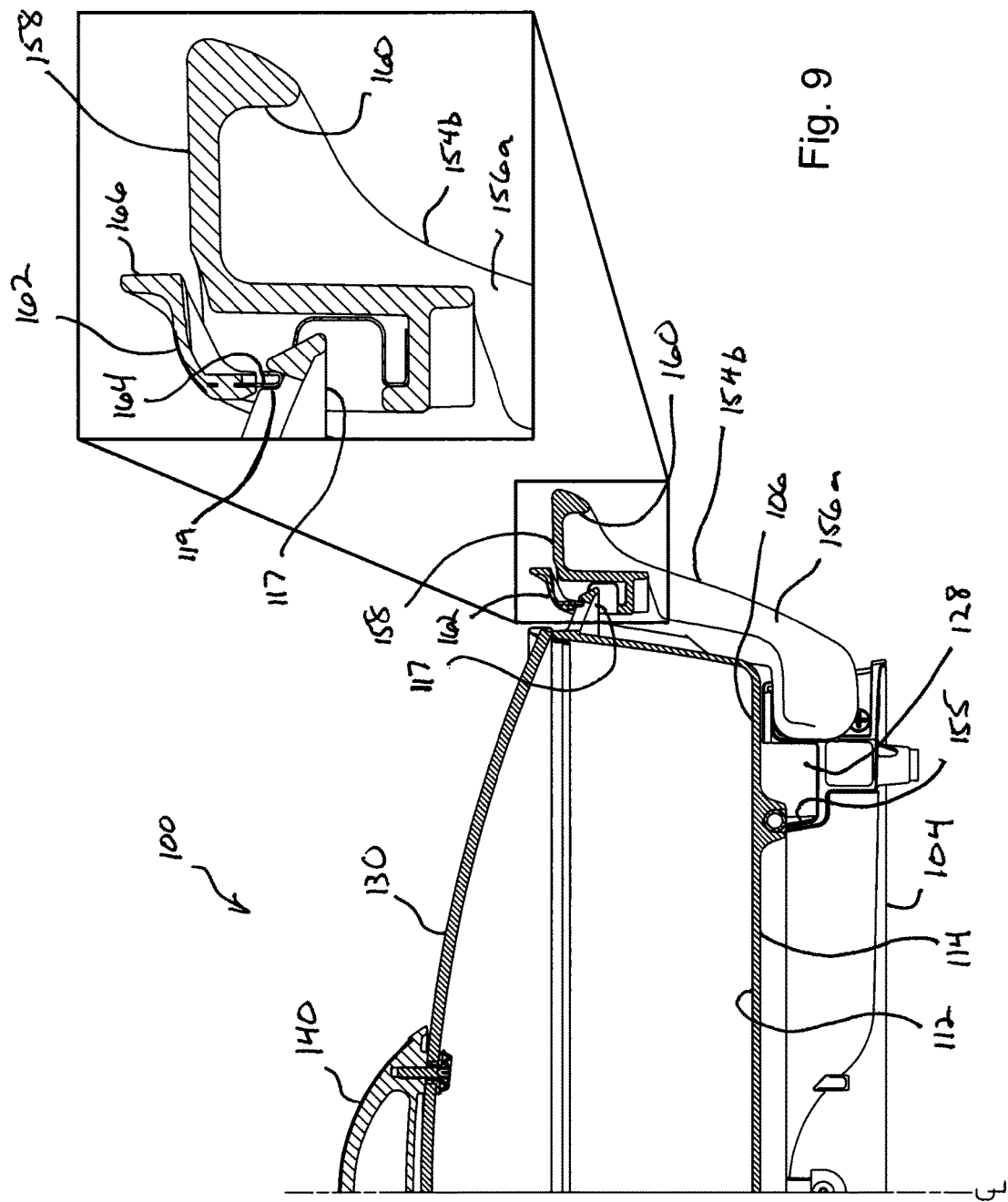
FIG. 9 is a side, partial section view of the countertop appliance of FIG. 1 including an enlarged view of a latch assembly according to an embodiment of the present invention.
Figure 10:
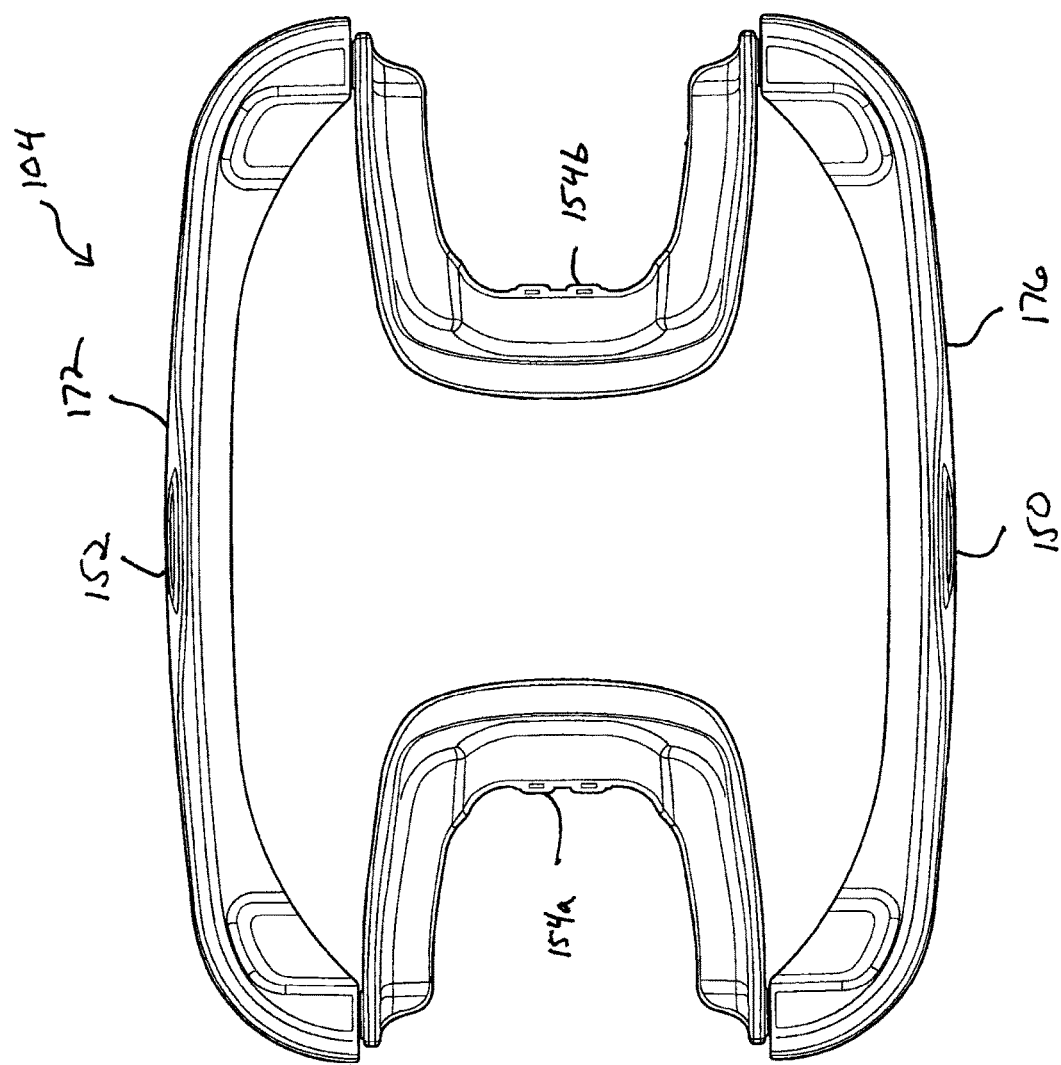
FIG. 10 is a bottom view of a detachable base arranged in a storage position according to an embodiment of the present invention.
Figure 11:
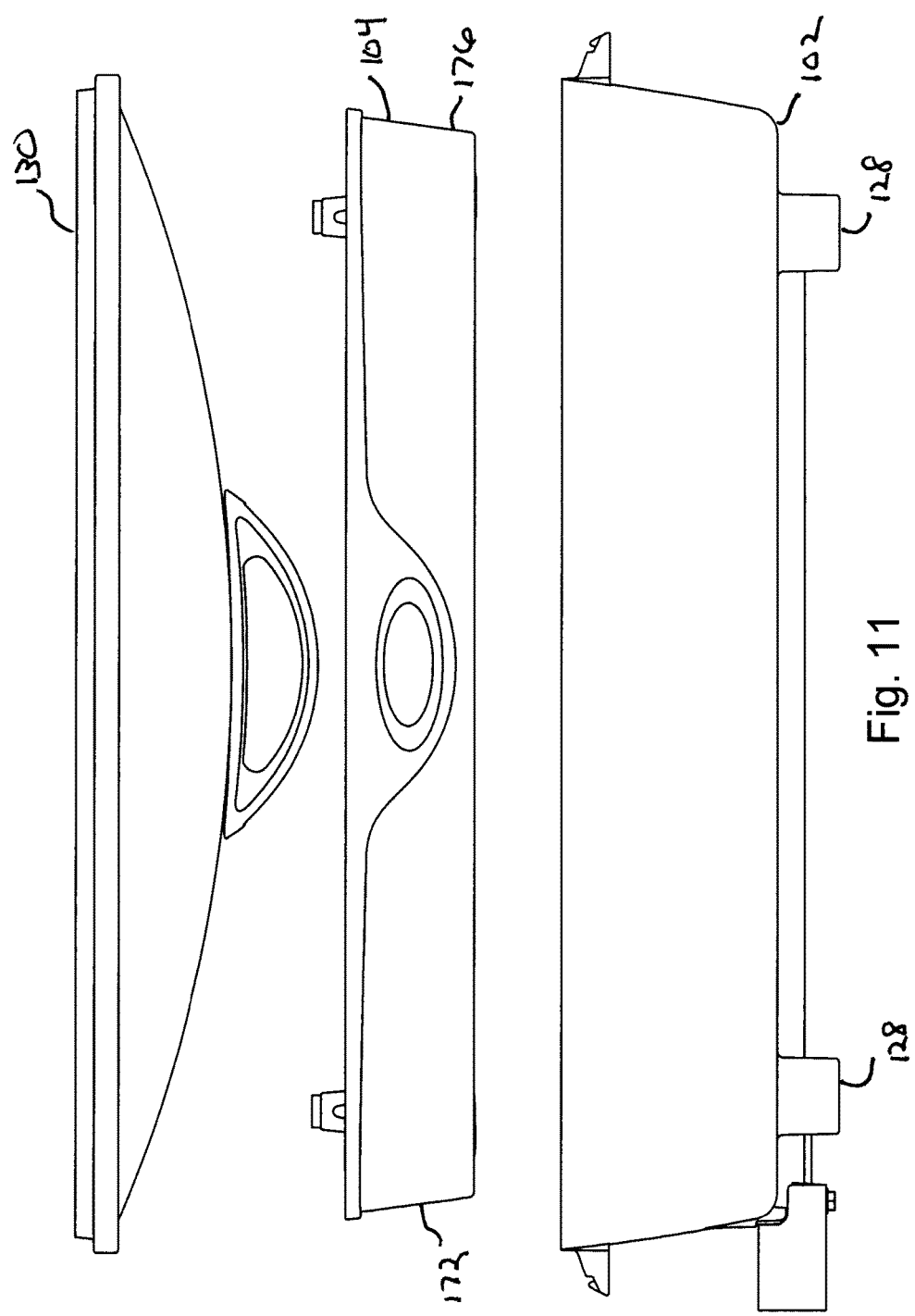
FIG. 11 is an exploded side view of the countertop appliance of FIG. 1 arranged to have a minimized storage orientation according to an embodiment of the present invention.
Figure 13:
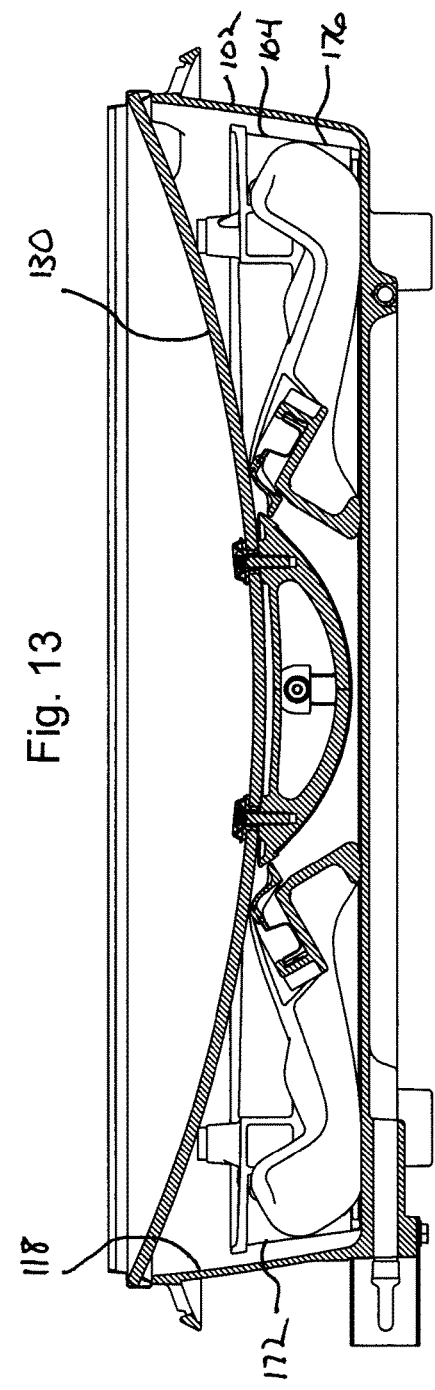
FIG. 13 is a side, section view of the countertop appliance of FIG. 1 in the minimized storage orientation of FIG. 12.

As depicted in FIGS. 1-11 and 13, base assembly 104 generally comprises a front wall 150 and a rear wall 152 connected with a pair of rotating handles 154a, 154b. Both the front wall 150 and rear wall 152 include a pair of mounting pockets 155 or for receiving the guide posts 128 when the detachable pan 102 is attached to the base assembly 104. Each rotating handle 154a, 154b includes a pair of side members 156a, 156b, a grasping member 158 and a pair of mounting arms 159a, 159b. Mounting arms 159a, 159b operably couple the rotating handles 154a, 154b to the base assembly 104 allowing the rotating handles 154a, 154b to be rotated relative to the base assembly 104. Grasping member 158 can include a projecting surface 160 allowing a user to conveniently grip and manipulate the handles 154a, 154b. Mounted to each grasping member is a locking assembly 162 that generally comprises a latch member 164 and an actuation member 166. Each rotatable handle 154a, 154b is capable of being rotated to a fully open position 168 for receiving the detachable pan 102 on the base assembly 104 as illustrated in FIG. 5, a locked position 170 for positively retaining the detachable pan 102 on the base assembly 104 as shown in FIGS. 1-4, 6, 7 and 9 and a storage position 172 in which handles 154a, 154b are rotated inwardly for placement and storage of the base assembly 104 within the internal pan volume 118 as shown in FIGS. 10, 11 and 13. Base assembly 104 can further comprise a plurality of feet 174 for supporting the base assembly 104 when positioned on a counter or table top.

In use, countertop appliance 100 is generally assembled as illustrated in FIG. 5 by placing the base assembly 104 on a suitable surface, such as, for example, a countertop or table such that the base assembly 104 is supported by feet 174. Handles 154a, 154b are rotated outwardly such that the base assembly 104 is in the fully open position 168. Next, the detachable pan 102 is positioned above the base assembly 104 with the guide posts 128 facing the base assembly 104. The detachable pan 102 is lowered onto the base assembly 104 such that the guide posts 128 set into the mounting pockets 155. Next, each of rotatable handles 154a, 154b, either individually or simultaneously, are rotated upwardly such that the grasping member 158 approaches the corresponding side wall 110a, 110b. As each grasping member 158 approaches the corresponding projecting member 117, latch member 164 comes into contact with and engages the corresponding latching detent 119. With each latch member 164 lockably engaged with the corresponding latching detent 119, the rotatable handles 154a, 154b assume the locked position 170 in which the detachable pan 102 is operably coupled to and retained by the base assembly 104.

With the detachable pan 102 operably coupled to and retained by the base assembly 104, a user can carry or otherwise position the countertop appliance 100 by grasping the projecting surface 160 on each grasping member 158. In this way, a user can transport the countertop appliance 100 and any food contained within the detachable pan 102 without concern or the potential for separation of the detachable pan 102 from the base assembly 104. For instance, a user can carry the countertop appliance 100 from a countertop to a table top to allow food cooked within the detachable pan 102 to be served without danger of spilling.

Following cooking and serving of food with the countertop appliance 100, the detachable pan 102 can be detached from the base assembly 104 to allow for easier cleaning of the detachable pan, either by hand cleaning or in a dishwasher. Generally, the user releases attachment of the handles 154a, 154b by sliding the corresponding actuation member 166 outwardly. By outwardly sliding the actuation member 166, the corresponding latch member 164 is disengaged from the latching detent 119 of the corresponding projecting member 117. With the latch member 164 disengaged, the user can grasp each handle 154a, 154b using grasping member 158 and rotate handles 154a, 154b to fully open position 168. With handles 154a, 154b of the base assembly in fully open position 168, the detachable pan 102 can be lifted off the base assembly 104 to facilitate cleaning of the detachable pan 102 and base assembly 104 if necessary.

Figure 12:
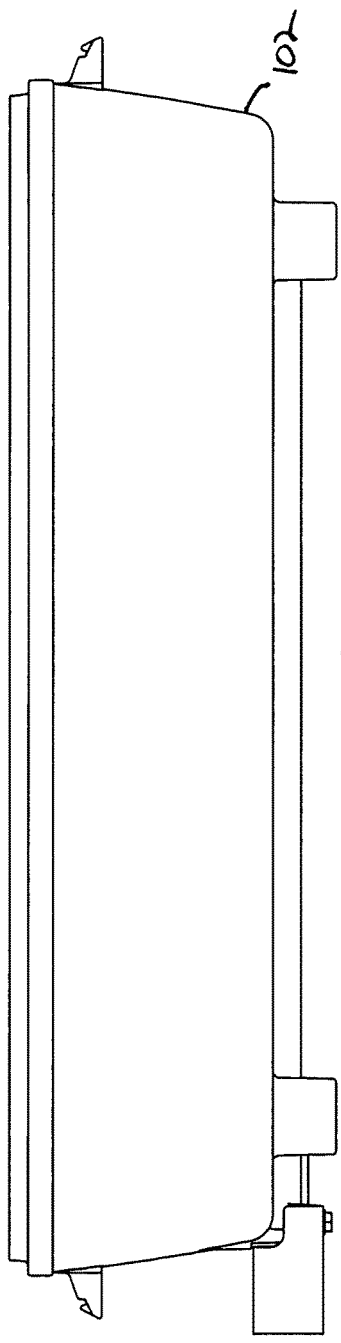
FIG. 12 is a side view of the countertop appliance of FIG. 1 in a minimized storage orientation according to an embodiment of the present invention.

Following cleaning of the detachable pan 102, base assembly 104 can be manipulated as shown in FIG. 10 to reduce the amount of storage space required for countertop appliance 100. As seen within FIG. 10, handles 154a, 154b can be rotated to a storage position 176 in which the handles 154a, 154b reside between the front wall 150 and rear wall 152. When base assembly 104 is arranged in storage position 176, the base assembly 104 can be set and contained with the internal pan volume 118 of the detachable pan 102 as illustrated in FIGS. 11-13. Following placement of the base assembly 104 within the detachable pan 102, lid 130 can be placed onto detachable pan 102 and the countertop appliance 100 can be stored without requiring additional space for the base assembly 104. In some embodiments, lid 130 can be inverted when being placed onto detachable pan 102 to further reduce the storage size of countertop appliance 100.

In another representative embodiment as illustrated in FIGS. 14-20, a countertop griddle 200 can comprise a detachable cooking surface 202 and a base assembly 204. Generally, detachable cooking surface 202 is defined by a griddle floor 206, front and rear walls 208a, 208b and side walls 210a, 210b. Griddle floor 206 includes an upper cooking surface 212 and a bottom heating surface 214. Each of the front and rear walls 208a, 208b and side walls 210a, 210b share a nominal wall height 216 so as to retain food on the upper cooking surface 212. Each of side walls 210a, 210b includes a projecting latch member 218. A resistive heating element mounted 221 is located in direct contact with or in close proximity to the bottom heating surface 214. The resistive heating element 221 can be operably connected to a receptacle 222 allowing an electrical supply to be connected to the countertop griddle 200. A plurality of guide posts 224 can be operably connected to the bottom heating surface 214.

Figure 16:
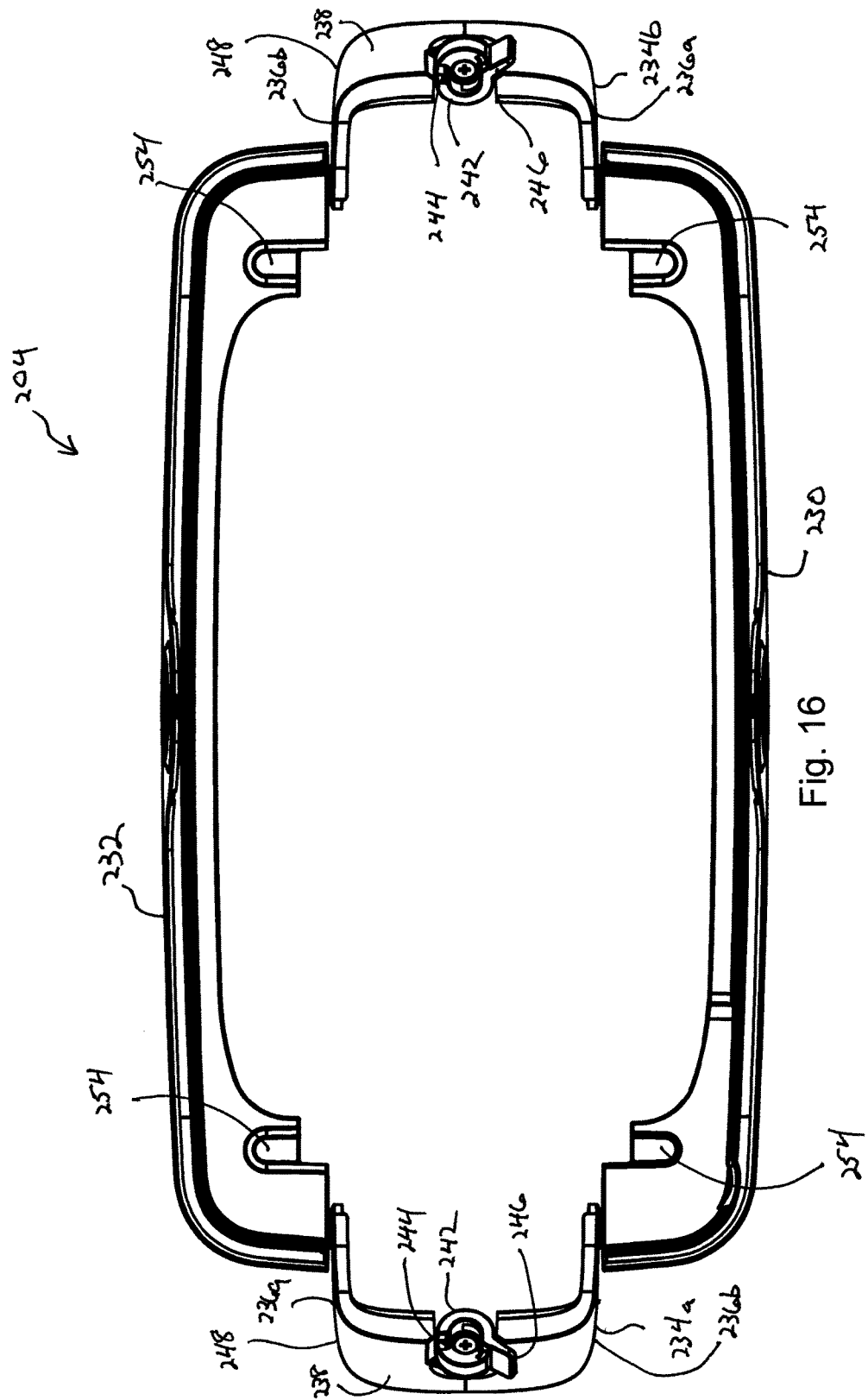
FIG. 16 is a plan view of a base assembly for use with the griddle of FIG. 14 according to an embodiment of the present invention.

Base assembly 204 generally comprises a front wall 230 and a rear wall 232 connected with a pair of rotating handles 234a, 234b. Each rotating handle 234a, 234b includes a pair of side members 236a, 236b and a grasping member 238. Grasping member 238 can include a projecting surface 240 allowing a user to conveniently grip and manipulate the handles 234a, 234b. Mounted to each grasping member 238 is a locking assembly 242 that generally comprises a rotatable cam member 246 including a locking detent 244. Each rotatable handle 234a, 234b is capable of being rotated to a fully open position 248 for receiving the detachable cooking surface 202 on the base assembly 204 as illustrated in FIGS. 14-16 and a locked position 250 for positively retaining the detachable cooking surface 202 on the base assembly 204 as shown in FIGS. 17-20. Base assembly 204 can further comprise a plurality of feet 252 for supporting the base assembly 204 when positioned on a counter or table top.

In use, countertop griddle 200 is generally assembled by placing the base assembly 204 on a suitable surface, such as, for example, a countertop or table such that the base assembly 204 is supported by feet 252. Handles 234a, 234b are rotated outwardly such that the base assembly 204 is in the fully open position 248. Next, the detachable cooking surface 202 is positioned above the base assembly 204 with the guide posts 224 facing the base assembly 204. The detachable cooking surface 202 is lowered onto the base assembly 204 such that the guide posts 224 set into the guide pockets 254. Next, each of rotatable handles 234a, 234b, either individually or simultaneously, are rotated upwardly such that the grasping member 238 approaches the corresponding side wall 210a, 210b. As each grasping member 238 approaches the corresponding projecting latch member 218, rotatable cam member 246 can be rotated so as to engage and capture the corresponding projecting latch member 218. The camming action of the rotatable cam member 246 creates a positive lock with the projecting latch member 218 and provides an indication to the user that the positive lock has been created when projecting latch member 218 engages the locking detent 244. With the rotatable actuation member 246 lockably engaged to the corresponding projecting latch member 218, the rotatable handles 234a, 234b assume the locked position 250 in which the detachable cooking surface 202 is operably coupled to and retained by the base assembly 204.

With the detachable cooking surface 202 operably coupled to and retained by the base assembly 204, a user can carry or otherwise position the countertop griddle 200 by grasping the projecting surface 240 on each grasping member 238. In this way, a user can transport the countertop griddle 200 and any food contained on the detachable cooking surface 202 without concern or the potential for separation of the detachable cooking surface 202 from the base assembly 204 due to the positive lock created between projecting latch member 218 and rotatable cam member 246. For instance, a user can carry the countertop griddle 200 from a countertop to a table top to allow food cooked on the detachable cooking surface 202 to be served without danger of spilling.

Following cooking and serving of food with the countertop griddle 200, the detachable cooking surface 202 can be detached from the base assembly 204 to allow for easier cleaning of the detachable cooking surface 202, either by hand cleaning or in a dishwasher. Generally, the user releases attachment of the handles 234a, 234b by rotating the rotatable cam member 246 such that the projecting latch member 218 disengages from the locking detent 244 with the rotatable cam member 246 being fully turned until the projecting latch member 218 is completely released. With the rotatable cam member 246 disengaged from the projecting latch member 218, the user can grasp each handle 234a, 234b using grasping member 238 and rotate handles 234a, 234b to fully open position 248. With handles 234a, 234b of the base assembly 204 in fully open position 248, the detachable cooking surface 202 can be lifted off the base assembly 204 to facilitate cleaning of the detachable cooking surface 202 and base assembly 204 if necessary.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

What is claimed:

1. A method for reducing packaging and storage volume for a countertop appliance, comprising:
    providing a base assembly with a front wall and a rear wall, the base assembly further including a pair of rotatable handles operably connected with the front wall and the rear wall;
    providing a pan having an interior pan volume, said pan configured to reside on the base assembly wherein the pair of rotatable handles are rotated to a locked position and wherein the pair of rotatable handles latch onto the pan;
    rotating the pair of rotatable handles to detach the pair of rotatable handles from the pan, whereby the pan is removed from the base assembly;
    rotating the pair of rotatable handles to a storage position wherein the pair of handles reside within a physical boundary of the base assembly defined by the front wall and rear wall; and
    placing the base assembly arranged in the storage position within the interior pan volume.

2. The method of claim 1, further comprising:
    providing a lid configured for placement on the pan to cover the interior pan volume;
    positioning the lid such that the lid is capable of residing within the interior pan volume; and
    placing the lid within the interior pan volume.

3. The method of claim 1, wherein the pan comprises a skillet pan.

4. A method for disassembling a countertop appliance, comprising:
    providing a countertop appliance including a detachable pan configured for detachable mounting onto a base assembly, the base assembly including a pair of handles latched to the detachable pan;
    unlatching each handle from the detachable pan;
    rotating the pair of handles on the base assembly such that each handle is disengaged from the detachable pan;
    lifting the detachable pan off the base assembly;

rotating the handles to a storage position in which each handle resides between a front wall and a rear wall of the base assembly; and setting the base assembly into an internal pan volume of the detachable pan.

5. The method of claim 4, wherein the step of unlatching each handle from the detachable pan, further comprises:

rotatably unlatching each handle from the detachable pan.

6. The method of claim 4, further comprising:

removing a lid from the detachable pan; and placing the lid in the internal pan volume of the detachable pan.

7. The method of claim 6, wherein the step of placing the lid in the internal pan volume of the detachable pan further comprises:

inverting the lid prior to placing the lid in the internal pan volume.

\* \* \* \* \*